United States Patent
Bhatia et al.

(10) Patent No.: US 6,775,752 B1
(45) Date of Patent: Aug. 10, 2004

(54) SYSTEM AND METHOD FOR EFFICIENTLY UPDATING A FULLY ASSOCIATIVE ARRAY

(75) Inventors: Rohit Bhatia, Fort Collins, CO (US); David P Hannum, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/510,288

(22) Filed: Feb. 21, 2000

(51) Int. Cl.$^7$ .................. G06F 12/00; G06F 9/312; G11C 8/00
(52) U.S. Cl. .................. 711/159; 711/5; 711/131; 711/133; 711/149; 711/128; 711/150; 711/168; 712/217; 365/189.04; 365/220; 365/230.03; 365/230.05
(58) Field of Search .................. 711/149–150, 168, 711/131, 210, 221, 128, 137, 216, 5, 133–134, 108, 136, 158–160, 144–145, 151, 204–208; 712/216–217; 365/230.03, 230.05, 189.04, 189.07, 220, 49

(56) References Cited

U.S. PATENT DOCUMENTS

| | | | |
|---|---|---|---|
| 4,197,580 A | * 4/1980 | Chang et al. | 711/144 |
| 4,665,479 A | 5/1987 | Oinaga | 712/4 |
| 4,980,817 A | 12/1990 | Fossum et al. | 712/4 |
| 5,848,256 A | * 12/1998 | Call et al. | 712/216 |
| 6,029,242 A | 2/2000 | Sidman | 712/42 |
| 6,202,204 B1 | * 3/2001 | Wu et al. | 717/9 |
| 6,282,505 B1 | * 8/2001 | Hanawa | 711/149 |
| 6,453,387 B1 | * 9/2002 | Lozano | 711/133 |
| 6,618,803 B1 | * 9/2003 | Hannum et al. | 712/225 |

FOREIGN PATENT DOCUMENTS

EP  0725334  8/1996  ............. G06F/9/38

OTHER PUBLICATIONS

United Kingdom Search Report for Application No. GB 0104188.8 dated Dec. 14, 2001.

* cited by examiner

*Primary Examiner*—Denise Tran

(57) ABSTRACT

The present invention relates to a mechanism for updating a fully associative array which is used to store entries associated with speculated instructions. Preferably, the array includes a plurality of data banks for storing entries, a plurality of ports for writing to the plurality of data banks, pointers associated with the respective banks for identifying table locations suitable for overwriting by upcoming entries, wherein an entry is suitable for overwriting when it is deemed invalid by the inventive system. A preferred embodiment is disclosed involving two ports writing to two banks wherein a plurality of factors is considered in deciding where prospective entries from the two ports will be written in the table. The Factors include, matches between existing and prospective entries, the default designated data bank for a given port, whether two write operations are being attempted simultaneously, and the number of entries already present in each data bank.

15 Claims, 4 Drawing Sheets

SYSTEM AND METHOD FOR EFFICIENTLY UPDATING A FULLY ASSOCIATIVE ARRAY

RELATED APPLICATIONS

Reference is hereby made to concurrently filed, co-pending and commonly assigned U.S. patent applications application Ser. No. 09/510,278 (filed Feb. 21, 2000), entitled "MECHANISM FOR DATA FORWARDING"; application Ser. No. 09/510,128 (filed Feb. 21, 2000), entitled "SYSTEM AND METHOD FOR RESETTING AND INITIALIZING AN ALAT TO A KNOWN STATE AT POWER ON OR THROUGH A MACHINE SPECIFIC STATE,"; and application Ser. No. 09/510,282 (filed Feb. 21, 2000 and issued as U.S. Pat. No. 6,618,803), entitled "SYSTEM AND METHOD FOR FINDING AND VALIDATING THE MOST RECENT ADVANCE LOAD FOR A GIVEN CHECK LOAD" which disclosures are incorporated herein by reference.

TECHNICAL FIELD

This invention relates generally to a system and method for updating a fully associative array and more particularly to updating a fully associative array having a plurality of data banks and a plurality of ports connected thereto.

BACKGROUND

It is generally desirable to reorder selected instructions in a computer program to improve program execution efficiency. One form of such reordering is that of moving or speculating instructions which load data from certain memory locations as well as instructions which may use the data received in the load instructions with respect to store instructions. A hazard associated with such reordering may exist where a store instruction, which succeeds the speculated load instructions and instructions using loaded data ("use" instructions), accesses the same memory location as one or more speculated load instructions. In this case, the speculation will generally have had the effect placing incorrect data into to registers accessed by the speculated instructions. Where such a conflict occurs, execution of the load instruction and any "use" instructions (instructions using the loaded data) will be invalidated and undone. Recovery will generally be executed which may include canceling, re-fetching, and re-executing the instructions rendered invalid by the conflict with the store operation.

One prior art approach to responding to such a conflict arising from a speculation is to allow the store instruction which conflicts with the speculated load instruction to become the oldest instruction in a pipeline and retire, while instructions after the store are canceled, re-fetched, and re-executed once the store instruction has been committed to a cache or memory hierarchy.

One problem arising in the prior art is that there is generally no software control over the storing, loading, and reordering operations at run-time. Another problem is that the use of hardware imposes limitations on the instruction window size, thereby limiting the available code optimizations. Furthermore, there is a generally a large recovery penalty in the prior art, where the extent of such penalty generally depends upon the way in which the hardware implements the optimization process.

Therefore, it is a problem in the art that hardware optimization implementations must generally perform optimizations within a limited instruction window size.

It is a further problem in the art that a large recovery penalty results in a hardware controlled optimization process.

It is a still further problem in the art that there is there is generally no software control over the storing, loading, and re-ordering operations at run-time.

SUMMARY OF THE INVENTION

These and other objects, features and technical advantages are achieved by a system and method which splits original load instructions into advanced load instructions and check instructions. The advanced load instructions are preferably placed in a more advanced location in a code sequence than corresponding original load instructions and operate to load data. Each check instruction preferably operates to check the validity of advanced load instructions employing a particular register, identifies the most recent advanced load instruction employing that register, and validates the identified most recent advanced load instruction by comparing it to store instruction address information pending in an instruction queue or pipeline. Where no match is found with store instruction address information, the speculation is preferably considered to have succeeded, thereby indicating that the placement of the advanced load instruction did not conflict with any store instruction and that the speculation of this advanced load instruction was therefore successful. Generally, upon splitting an original load instruction, as mentioned above, an advanced load instruction corresponding to the original load instruction is placed before a selected store instruction, and a check instruction corresponding to the original load instruction is kept in the location of the original load instruction in an optimized code sequence.

Identification of the most recent advanced load instruction and validation of this advanced load instruction against store address information are preferably accomplished independently and in parallel, thereby preferably improving overall cycle time and effecting transmission of conflict information (the "hit" or "miss" status of a comparison with store address information) to an exception handling unit early enough to initiate recovery.

Preferably, one or more tables are employed for storing information associated with advanced load instructions. The tables employed for this purpose are preferably fully associative, thereby enabling comparisons of one datum such as a store instruction memory address with any data entry stored in the table. Fully associative tables also preferably enable register numbers and memory addresses to be stored anywhere in the table, thereby obviating a need to index the table according to register number. In a preferred embodiment, data preserved in association with an advanced load instruction may include the register number to which an instruction loaded data, the memory address from which the data was loaded, and a log of the validity status of the advanced load instruction. Such information may be kept in a single table, or stored in corresponding locations in a plurality of separate tables.

In a preferred embodiment, a fully associative table (or array) is deployed which includes a plurality of data banks and a plurality of ports able to write to the plurality of data banks, or "banks." The inventive mechanism thereby preferably enables simultaneous updates of the table by employing separate ports writing to separate banks in parallel. Such parallel operation preferably operates to enable multiple table updates to be effected during a single cycle.

In a preferred embodiment, for each prospective entry at a port, the inventive mechanism employs a set of factors to determine which bank and which entry location within a bank the prospective entry will be written to. Regarding bank selection, the factors generally include whether or not a match exists between the prospective entry and an existing table entry, a default bank connection for the port at which the prospective entry resides, and the operation of randomization logic to substantially equalize data storage among the plurality of banks. Regarding entry location selection, the factors generally include: whether or not a match exists between the prospective entry, a table entry location of a next invalid entry, and a table entry location of a next sequential entry within one bank (in the case where all entries in a bank are valid).

It is an advantage of a preferred embodiment of the present invention that a fully associative table may be updated in a single cycle.

It is a further advantage of a preferred embodiment of the present invention that a plurality of linked fully associative tables may efficiently interact to rapidly update an overall system status.

It is a still further advantage of a preferred embodiment the present invention that more than one update to a fully associative table or array may be performed simultaneously.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
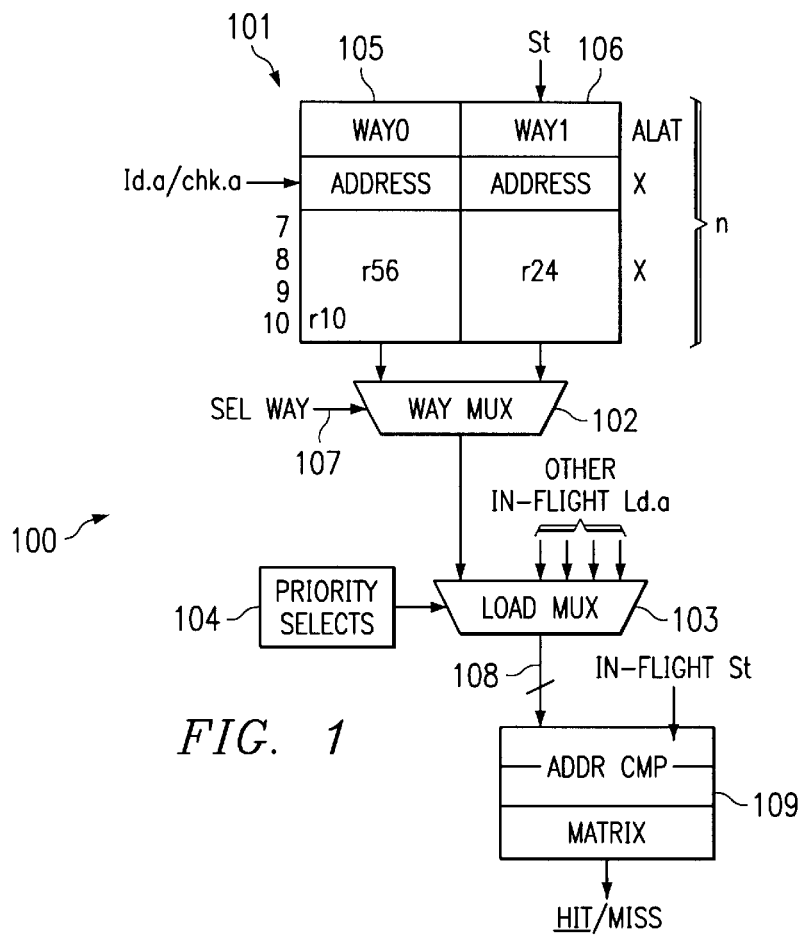
FIG. 1 depicts a mechanism for identifying conflicts between an advanced load instruction and a store instruction employing a two-way set associative implementation.

FIG. 1 depicts a mechanism 100 for identifying conflicts between an advanced load instruction and a store instruction employing a two-way set associative implementation. ALAT (advanced load address table) 101 is generally employed for storing addresses associated with advanced load instructions, which addresses are generally indexed according to register number. The ALAT 101 generally includes two "ways" or paths 105 and 106 for addresses stored in ALAT 101. Generally a four bit representation is employed to identify the index number of a memory address stored in ALAT 101.

Generally, an entry is created by placing a memory address associated with an to advanced load instruction in a table location corresponding to an index position which corresponds to the register number employed in the pertinent advanced load instruction. The number of bits used to designate an entry location is generally determined by the amount of space available in the table. For example, where the table may contain 16 entries, a 4 bit representation will generally be employed.

Generally, the information stored in each entry in ALAT 101 includes a memory address, a tag, and a selection of bits from the register i.d. A "tag" is a datum which is derived from either a memory address or register i.d. and which substantially uniquely defines such memory address or register i.d. For example, where 40 bit memory addresses are concerned, 10 bits of the full 40 bits may be stored in a tag associated with a particular memory address. There is generally a tradeoff between the space required to store the tags and the possibility of conflict between tags representing different memory addresses. The information stored in each entry may further include type and frame bits associated with each entry.

An exemplary case may involve advanced load instructions associated with register numbers R8, R24, and R56. The availability of two separate ways, way0 105 and way1 106, generally enables two entries to be entered into the table where the two entries are associated with the same 4 bit value. However, the three listed registers have the same lower 4 bits and the table will therefore not be able to store the memory addresses associated with all three of registers 8, 24, and 56 simultaneously. Generally, when there is an attempt to introduce a third entry with a register i.d. having the same 4 bit sequence, one of the prior entries will have to replaced to make room for the most recent entry.

Generally, when a check instruction is encountered in program execution, the register number associated with the check instruction is communicated to ALAT 101 causing memory addresses stored in both ways 105 and 106 of ALAT 101 to be directed toward WAY MUX 102. Generally, at WAY MUX 102, a correct WAY is selected 107 according to the register number, and a resulting address is generally directed toward LOAD MUX 103. LOAD MUX 103 generally operates to select between memory addresses associated with a table entry advanced load instruction discussed above and addresses associated with in-flight advanced load instructions in order to provide a final address 108 to address compare matrix 109. Address compare matrix 109 generally operates to compare final addresses 108 to memory addresses accessed by in-flight store instructions to generate a hit/miss determination for a particular check.a or load check instruction. It is noted that address compare matrix 109 depicted in FIG. 1 is different from compare matrix 305 depicted in FIGS. 3 and 4.

One problem which may arise with the system of FIG. 1 is that of storage capacity of two way associative ALAT 101. Storage limitations, such as the one discussed above in connection with different registers having bit sequences in common, may cause valid addresses to be discarded from ALAT 101. Another problem is that the priority select operation 104 is performed serially in conjunction with MUX 103 causing addresses to be held up before being sent to the address compare matrix. Yet another problem is that the address compare matrix 109 also operates serially. The structure of FIG. 1 generally requires two machine cycles in order to make a hit/miss determination for a particular check instruction.

Figure 2:
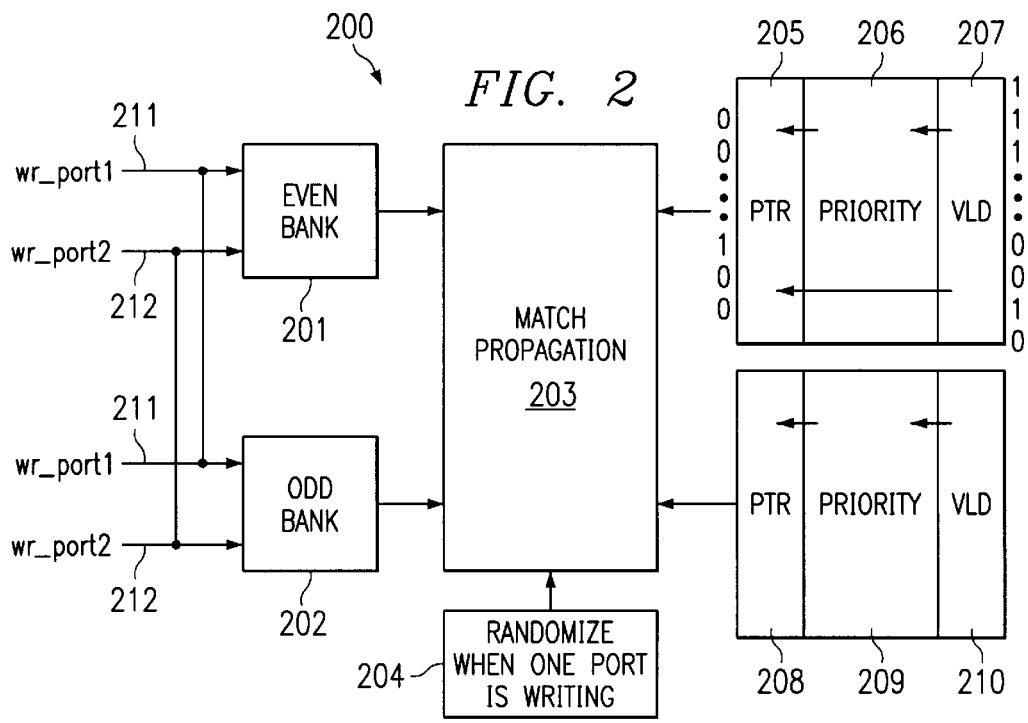
FIG. 2 is a functional block diagram which depicts the operation of a fully associative table according to a preferred embodiment of the present invention.

FIG. 2 is a functional block diagram which depicts the operation of a fully associative table 200 according to a preferred embodiment of the present invention.

In a preferred embodiment, fully associative table 200 includes two banks (or data banks) 201 and 202 for storing register numbers (or register i.d.s) each of which may preferably be written to by two ports: port 1 and port 2. The banks preferably enable the process of updating fully associative table 200. It will be appreciated that fully associative table 200 may alternatively include one bank, or three or more banks, and that all such variations are included within the scope of the present invention. Furthermore, one port or three or more ports may be used to write to fully associative table 200 employing whatever number of banks is available. The invention is thus not limited to a particular number of banks or to a particular number of ports. While the embodiment of FIG. 2 concerns the storage of register numbers, other data may be stored in fully associative table 200, such as, for example, memory addresses and validity bits indicating a validity status of a memory address stored in the same or another data table.

In a preferred embodiment, one or more fully associative tables may be used to store information describing speculated instructions, such as advanced load instructions, in order to conduct check operations on the speculated instructions employing check instructions. The results of such check instructions may enable a code sequence to determine which speculated instructions were successful and which encountered a conflict with other instructions, such as a memory address conflict with a store instruction. A "hit" or "miss" determination may then be established for a given speculated instruction, wherein a hit generally indicates that a speculated instruction was successful and a miss generally indicates that a speculated instruction was unsuccessful, thereby generally causing recovery code to be executed to undo the unsuccessful speculation.

In a preferred embodiment, pointers 205 and 208 cooperate with prioritization logic (206 and 209) and validity logic (207 and 210) to aid in deciding which table locations will be written to for a particular prospective entry. Two banks are preferably employed to enable multiple ports to access table 200 simultaneously. Preferably, when only one port is writing to table 200, randomization logic 204 is employed to substantially evenly distribute written entries to table 200 among even bank 201 and odd bank 202. Randomization logic 204 may also operate to direct communication from a given port to a bank other than a default bank for such port in order to avoid a conflict with ongoing communication involving the default bank. Prioritization logic is preferably employed to find the first invalid entry in a bank. Specifically, prioritization logic 206 preferably operates to identify the first invalid entry in even bank 201, while prioritization logic 209 preferably performs the same identification for odd bank 202.

In a preferred embodiment, a system of entry writing principles is established for determining where in table 200 new entries will be written. This entry writing system is referred to herein as "match propagation logic" and is indicated by reference numeral 203 in FIG. 2. Preferably, the highest ranking principle in the entry writing system is that a given register i.d. or number may only be present in one location in table 200. Therefore, if a match (in register number or i.d.) is found between an entry to be written and an entry already present in table 200, the existing entry is preferably overwritten regardless of other entry writing considerations. Herein, the term "prospective entry" generally refers to an entry to be written into table 200 from a port, the term "table entry" generally refers to an entry already resident in table 200, and the term "bank entry" refers to an entry already present in either even bank 201 or odd bank 202.

In a preferred embodiment, a second consideration in selecting table locations for new entries is that of entry validity. Once a port has been allocated to a bank, a pointer indicating a table location to be overwritten is preferably adjusted to point to the lowest numbered invalid entry. The new entry is then preferably written to that table location. If there are no entries in table 200 matching the new entry, and no invalid entries can be identified in the bank being written to, the pointer is preferably advanced to the next sequential entry. The next sequential entry is selected so as to preferably select an older (valid) entry in table 200 for overwriting.

In a preferred embodiment, prior to selecting the even bank 201 or odd bank 202, or selecting a pointer position within a selected bank for storage of new entry, the entire table 200 is searched for entries matching a new entry to written into table 200. If there is a matching entry, such as, for example, an entry which matches the register number of the proposed new entry, the new entry will preferably be written to the table location containing the matching entry.

In a preferred embodiment, where a prospective entry does not match any existing table entry, and there is no entry writing operation in progress which would conflict with the default bank associated with the port containing the prospective entry, the prospective entry is preferably written to the default bank associated with the port containing the prospective entry.

In a preferred embodiment, where prospective table entries are present on both ports, and neither of the entries matches an entry already present in table 200, default selections may be implemented, thereby enabling selection of banks for writing entries from each of the ports in the absence of an overriding reason to write a bank other than the default bank. One exemplary default arrangement may include directing entries from port 1 211 to even bank 201 by default and directing entries from port 2 212 to odd bank 212 by default. It will be appreciated that different default conventions may be employed and that all such variations are included within the scope of the present invention. Further, default conventions, once selected, may be overcome where circumstances warrant, such as, for example, where a match is found between an entry to be written from a port to the table, and a table entry in a bank other than the default bank for that port is found to match the entry to be written.

Herein, terms beginning with a capital "R" and ending with numeric characters, such as "R10," generally refer to register numbers which may be written as entries into table 200. In the example provided, R10 refers to register 10.

For example, where entries R10 and R11 are being written into table 200 from port 1 211 and port 2 212, respectively, then R10 would be preferably written to even bank 201 and R11 to odd bank 202. Alternatively, if an R10 entry already resides in odd bank 202, and R11 was found not to match any entry in table 200, R11 would preferably be written to even bank 201. Within even bank 201, R11 would preferably be written to a location corresponding to the location of the first invalid entry in that bank. In the above-described manner, the two entries, R10 and R11, may advantageously be written into fully associative table 200 simultaneously, thereby effecting two entry write operations in a single cycle. It will be appreciated that the ability to simultaneously handle two entries at once preferably enables simultaneous processing of a range of possible sets of multiple instructions, such as, for example, two advanced load instructions, two check instructions, or two store instructions. Depending on the storage purpose of the table, simultaneous loading of instructions of varying type may be effected. Alternative embodiments of fully associative table 200 may include port connections and bank arrangements allowing for simultaneous processing of more than two entries.

In a preferred embodiment, a pointer for any given bank generally points to the first invalid entry within that bank, thereby establishing the table location of this first invalid entry as the location to which the next new entry will be written. Preferably, once the first invalid entry in a bank is identified, the pointer logic identifies the invalid entry location as proper for storing the next entry and marks other locations within the bank as improper for storage. Where a register i.d. table is being written to, an entry is marked as invalid when its corresponding memory address location has matched, or conflicted with, a store instruction memory location. Such a conflict generally invalidates an advanced load instruction and, accordingly, a register i.d. associated with such advanced load instruction. This process is described in greater detail in incorporated, commonly assigned application, application Ser. No. 09/510,282, now U.S. Pat. No. 6,618,803, entitled "SYSTEM AND METHOD FOR FINDING AND VALIDATING THE MOST RECENT ADVANCE LOAD FOR A GIVEN CHECK LOAD." Preferably, once a new entry is written to a table location indicated by a pointer, the pointer is appropriately adjusted to point to a new "first" invalid entry in the now updated bank of fully associative table 200.

Figure 3A:
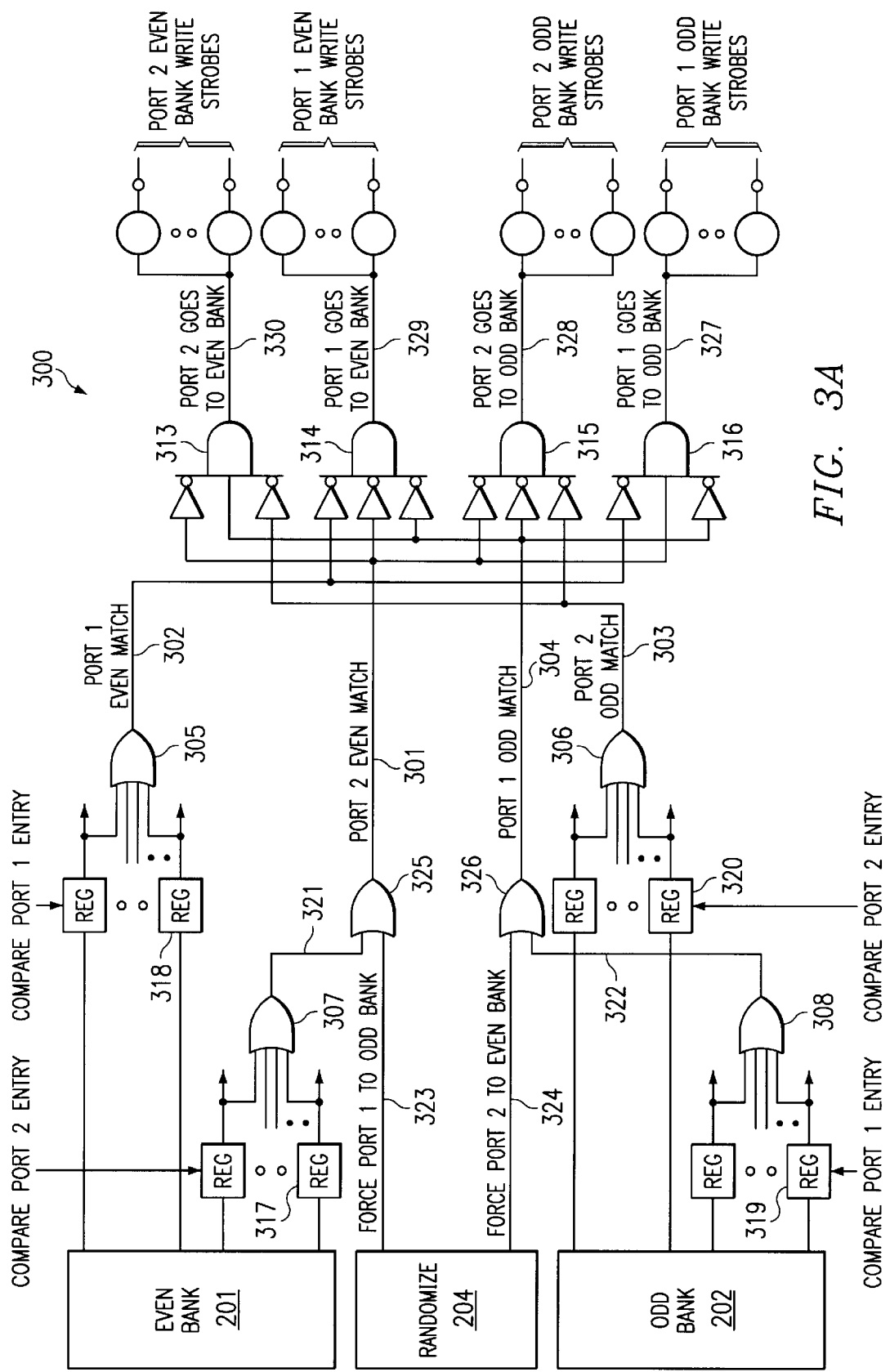
FIG. 3A depicts a structure for implementing propagation match logic for to updating a fully associative table according to a preferred embodiment of the present invention.

FIG. 3A depicts a hardware structure for implementing the propagation match logic employed to update a fully associative table according to a preferred embodiment of the present invention. The variables which generally operate to determine which entry locations in which banks particular entries at particular ports will be directed toward were discussed in connection with FIG. 2. Specifically, factors affecting where an entry will be written include default connections between the ports and the selected banks of a fully associative table, the presence of entries in a bank which match a prospective entry, and the location and availability of invalid entries suitable for overwriting. FIG. 3A depicts one possible design for implementing the logic discussed in connection with FIG. 2. The sequence of logic gates connected to even bank 201, odd bank 202, and randomize function 204 depicted in FIG. 3 preferably operates to implement the match propagation block 203 depicted in FIG. 2. It will be appreciated that numerous alternative designs involving a number of different digital logic gate sequences and/or software implementations could be employed to implement the entry writing scheme of the present invention, and that all such variations are included within the scope of the present invention.

In a preferred embodiment, prospective entries at port 1 211 and port 2 212 are simultaneously compared to all entries in both even bank 201 and odd bank 202. The particular case of a port 2 212 entry comparison with even bank 201 entries is discussed in detail in the following. It will be appreciated that comparisons involving the other three combinations of ports and banks in the embodiment of FIG. 3 operate in an analogous manner.

In a preferred embodiment, a prospective entry at port 2 212 is simultaneously compared with all entries in even bank 201 and the results of these compare operations placed in registers 317, wherein each register among registers 317 is associated with one entry in even bank 201. Preferably, a match condition is indicated by a logical 1 value in the appropriate register among registers 317. Preferably, each entry in even bank 201 is unique, and therefore, at most one register among registers 317 will present a matching condition between its associated entry in even bank 201 and the prospective entry at port 2 212. The compare results stored in registers 317 are then preferably OR-ed together at OR gate 307 to produce actual match result 321. Preferably, where any entry in even bank 201 matches the prospective entry at port 2 212, actual match result 321 will be set (i.e. have a logical value of 1).

In a preferred embodiment, the other three bankport combinations operate in like manner to that described above for the port 2 212 comparison with the entries of even bank 201. For the port 1 211 comparison with even bank 201, the port 1 211 prospective entry is preferably compared with all entries of even bank 201, the results stored in registers 318, and the values of registers 318 then OR-ed together at OR gate 305 to produce Port 1 even match output 302. For the port 1 211 comparison with odd bank 202, a prospective entry at port 2 212 is preferably compared with all entries in odd bank 202, the comparison results stored in registers 319, and the values of registers 319 OR-ed together at OR gate 308, producing actual match result output 322. For the comparison of port 2 212 with odd bank 202, a prospective entry at port 2 212 is preferably compared with all entries in odd bank 202, the comparison results stored in registers 320, and the values of registers 320 OR-ed together at OR gate 306, producing port odd match result 303.

In a preferred embodiment, randomization logic 204 may operate to change the bank to which a given port will write from its default bank to a non-default bank. This change in port-bank connections may be implemented in order to more equally distribute storage data among the banks. Randomization logic 204 preferably operates to change the port-bank connection only when one bank in system 300 is idle. In the embodiment of FIG. 3, port 1 211 defaults to the even bank 201, and port 2 212 defaults to the odd bank 202. It will be appreciated however, that alternative default arrangements could be selected and all such variations are included within the scope of the present invention.

In a preferred embodiment, one output from randomization logic 204 is "force port 1 to odd bank" ("force port 1") 323. The force port 1 323 output and the output from OR gate 307 are both inputs to OR gate 325 the output of which is "port 2 even match" 301. The output from OR gate 307 indicates an actual match status of port 2 212 with even bank 201 entries. In this manner, two possible conditions may cause port 1 211 to write to odd bank 202, the non-default bank for port 1. The first of the two conditions is preferably an actual match 321 of even bank 201 with port 2 212 as indicated by the output 321 of OR gate 307. The second of the two conditions is preferably the assertion of the force port 1 output 323 from randomization logic 204. Effectively, output 323 from randomization logic 204 operates as an emulated match which causes the logic circuitry to direct port 1 211 to write to odd bank 202 in the absence of an actual match between port 2 212 and the even bank 201. Generally, only one of inputs 321 and 323 will have a logic 1 value for any given write operation. Preferably, when either condition 321 (an actual match) or condition 323 (an emulated match) is asserted (has a logic 1 value) the port 2 even match 301 condition will be active, and port 1 will write to the odd bank 202.

In a preferred embodiment, the port 1 odd match 304 condition may similarly be obtained from either an emulated match or an actual match. The logic operates in an analogous manner to that described above for the case of port 2 even match 301. In this case, an actual match is indicated by output 322 from OR gate 308 indicating a match between port 1 211 and odd bank 202, and an emulated match is generated by the assertion of "force port 2 to even bank" output 324 from randomization logic 204. Preferably, both the emulated match indicated by condition 324 and the actual match indicated by condition 322 are fed into OR gate 326, thereby causing the port 1 odd match 304 condition to be asserted when either of conditions 322 or 324 is asserted. Generally, only one of conditions 322 and 324 may be asserted at any one time. Preferably, when the port 1 odd match 304 condition is asserted, port 2 212 will write to even bank 201.

With respect to AND gates 313 to 316, it may be seen that where all matching conditions 301 through 304 fail, the default port-bank connections are preferably made. Preferably, when all inputs to gates 314 and 315 are logical zeros prior to the invertors, the inputs will be all 1's after the invertors, causing the outputs of gates 314 and 315 to be high, in turn causing port 1 to write the even bank 201 and port 2 write to odd bank 202, which connections were previously identified as the default connections for the embodiment of FIG. 3A.

In a preferred embodiment, where port 2 even match 301 is asserted, port 1 211 preferably writes to odd bank 202. If force port 1 to odd bank 323 is asserted, port 2 212 preferably is inactive. Preferably, where port 1 odd match condition 304 is asserted, port 2 212 preferably writes to even bank 201. If force port 2 to even bank condition 324 is asserted, port 1 211 is preferably inactive.

In a preferred embodiment, AND gates 313 through 316 operate to implement port to bank connection logic. Where actual matches occur between prospective entries at port 1 211 or port 2 212 and any entry in even bank 201 or odd bank 202, such matches preferably operate to override the port to bank connection logic and pointers 205 and 208. Preferably, where actual matches occur between prospective entries and bank entries, the match condition operates to directly write the matching prospective entry to the bank entry location which was matched, thereby overriding the operation of the port to bank connection logic and the operation of pointers 205 and 208. For example, where port 1 odd match 304 is asserted, it may be seen that the signal from 304 is inverted before being input to AND gate 316 thereby causing "port 1 goes to bank odd" 327 signal to be unasserted or low. Preferably, the port 1 entry N match condition 355 (FIG. 3B) operates to directly write to the matching entry in odd bank 202, thereby overriding the port to bank connection logic and pointer 208 (not shown). One preferred mechanism for effecting writing to a bank entry location based on an actual match between prospective entry and a bank entry is discussed in greater detail in connection with FIG. 3B.

It will be appreciated that FIG. 3A depicts but one of many hardware designs which may be employed to implement the propagation match logic of the present invention. Numerous alternative hardware configurations, logic gate sequences, and, optionally, software implementations may be employed to implement the inventive mechanism, and all such variations are included within the scope of the present invention. While the embodiment of FIG. 3A concerns updating a fully associative table having four entries and eight write strobes, it will be appreciated that the inventive mechanism may be employed with fully associative tables having any number of banks, entries, and write strobes, and that all such variations are included within the scope of the present invention.

Figure 3B:
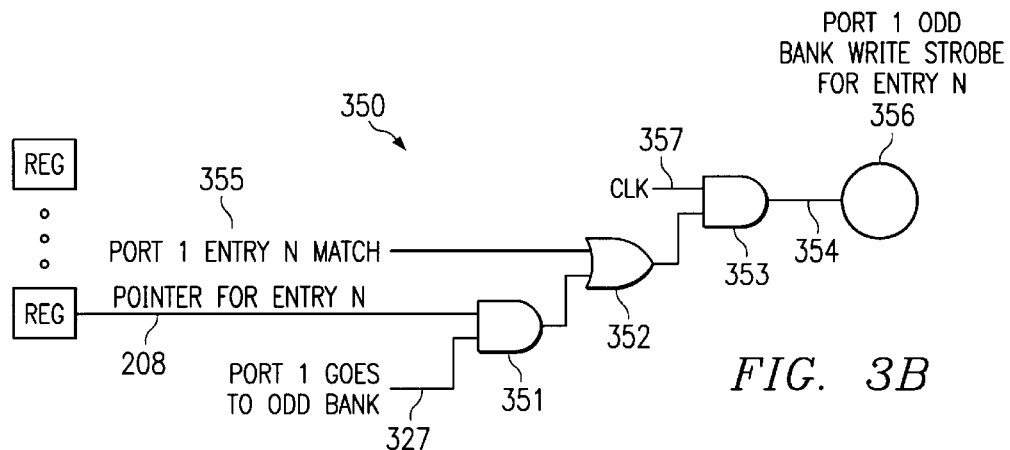
FIG. 3B depicts logic employed to write information to a particular entry location in a selected bank of a table according to a preferred embodiment of the present invention.

FIG. 3B depicts logic employed to write information to a particular entry location in a selected bank of a table according to a preferred embodiment of the present invention. In Preferably, port 1 odd bank write strobe 356 is one of two port 1 odd bank write strobes as depicted in the embodiment of FIG. 3A. Preferably, the logic discussed below in connection with generating signal 354 to activate write strobe 356 operates analogously for all eight write strobes in the embodiment depicted in FIG. 3A.

Reference is made to both FIGS. 3A and 3B in the following. In a preferred embodiment, one way to activate write strobe 356 is where port 1 entry N match 355 is asserted. Port 1 entry N match 355 preferably represents a matching condition between a prospective entry at port 1 with entry number "N" in odd bank 202, where element 356 is the write strobe for entry number "N" in odd bank 202. Generally, "N" may be any entry from the lowest to the highest numbered entry present in odd bank 202. When match 355 is asserted, the output of OR gate 352 is asserted, and when combined with clock pulse 357, operates to generate signal 354 to activate write strobe 356. Preferably, port 1 entry N match 355 is related to the assertion of port 1 odd match 304 in FIG. 3A. Where an actual match has occurred between port 1 211 (FIG. 3A) and the odd bank 202 (FIG. 3A), the port to bank connection logic is preferably overridden by having port 1 odd match 304 assertion cause the "port 1 goes to odd bank" 327 signal to be low. Preferably, the alternative input to OR gate 352 "port 1 entry N match" 355 is high, signifying an actual match between port 1 and the odd bank. The assertion of input 355 causes OR gate 352 output to be high, which in combination with clock 357 activates odd bank entry N write strobe 356. In this way, the assertion of port 1 entry N match 355 preferably operates to override the port to bank logic represented by "port 1 goes to odd bank" signal 327 and pointer 208.

In a preferred embodiment, in the absence of an actual match between port 1 and the odd bank, the port to bank connection logic and pointer 208 cooperate to activate the appropriate write strobe. Preferably, where the "port 1 goes to odd bank" condition 327 is asserted, and pointer 208 is pointing to entry N, then both inputs to AND gate 351 are high, thereby generating a logical high out of AND gate 351 which is preferably combined with clock pulse 357 to activate write strobe 356. It is noted that the "port 1 goes to odd bank" condition is the output 327 from AND gate 316 in FIG. 3A. This way of activating write strobe 356 generally arises where there is no actual match between a prospective entry on port 1and odd bank 202 (FIG. 3A). In the absence of an actual match, pointer 208 is preferably employed to indicate which entry in the odd bank the prospective entry will be written to. As discussed elsewhere in this application, pointer 208 preferably points to the lowest numbered invalid entry in odd bank 202 (FIG. 3A).

Generally, the number of instantiations of write strobe circuitry 350 in a table is the product of the number of ports, the number of banks, and the number of entries in each bank. In the embodiment depicted in FIG. 3A, where there are two ports, two banks, and two entries in each bank, there would preferably be eight instantiations of strobe circuitry 350. It will be appreciated that any number of ports, banks, and numbers of entries per bank may be employed, and that all such variations are included within the scope of the present invention.

It will be appreciated that FIG. 3B depicts but one of many hardware designs which may be employed to implement the entry writing logic of the present invention. Numerous alternative hardware configurations, logic gate sequences, and optionally, software to implementations may be employed to achieve a same or similar result, and all such variations are included within the scope of the present invention.

In a preferred embodiment, the mechanism for updating a fully associative array according to a preferred embodiment of the present invention may be employed for a range of possible data types and storage and updating operations. Data stored in the various entries may include register numbers, memory addresses, and/or validity status bits. Furthermore, many other data types may be stored and/or updated in entries within fully associative tables employing the mechanism of the present invention, and all such variations are included within the scope of the present invention.

Figure 4:
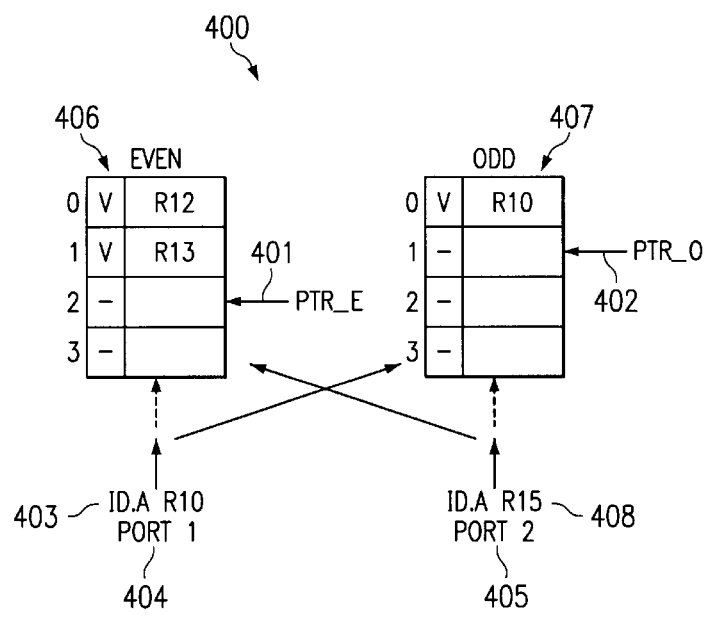
FIG. 4 is a logical block diagram depicting the writing of entries to odd and even banks of a fully associative table according to a preferred embodiment of the present invention.

FIG. 4 is a logical block diagram depicting the writing of entries to odd and even banks of a fully associative table according to a preferred embodiment of the present invention. FIG. 4 depicts an example of two ports writing to two banks wherein an exemplary set of entries already exist in the two banks. Simplified banks having only four entry locations are depicted as even bank 406 and odd bank 407.

Continuing with the example, even bank 406 is shown containing two valid entries R12 and R13, where bank entry positions 2 and 3 are invalid. Appropriately, even bank pointer 401 is shown pointing to the first invalid entry location in even bank 406. Odd bank 407 is shown containing one valid entry, R10, and three invalid entries in entry locations 1, 2, and 3. Odd bank pointer 402 is shown pointing to the first invalid entry location, position 1, in odd bank 407. Preferably, a default arrangement active in the exemplary embodiment of FIG. 4 involves writing port 1 404 entries to even bank 406 and port 2 405 entries to odd bank 407. As previously discussed, this default may be overcome under appropriate circumstances.

Continuing with the example of FIG. 4, an entry 403 at port 1 404 is a "load to R10" instruction, which will effectively operate to write the R10 value into either the even bank 406 or the odd bank 407. Although the default condition active in the present example would generally operate to direct the R10 entry 403 to even bank 406, a match condition exists between entry 403 and the R10 entry in table location 0 in odd bank 407, which match condition preferably overrides the default port to bank connection. Accordingly, the R10 entry 403 at port 1 404 is preferably written to entry location 0 in odd bank 407, thereby overwriting the pre-existing entry.

In a preferred embodiment, since the R10 entry 403 was written to odd bank 407, the R15 entry 408 on port 2 405 is preferably directed to even bank 406, thereby overriding the default destination bank for port 2 405. Causing port 2 to switch destination data banks preferably operates to present the further advantage of enabling the writes of R10 and R15 to occur simultaneously, thereby enabling both write operations to occur within a single cycle.

In a preferred embodiment, randomization logic 204 (FIGS. 1 and 2) may cause the ports to write to banks other than their respective default banks in order to effect a more even distribution of data storage between the banks. For example, in the embodiment of FIG. 4, if even bank 406 contained more entries than odd bank 407, randomization logic 204 (FIGS. 1 and 2) could cause port 1 to write to odd bank 407, its non-default bank, in order to ensure more equal use of the two banks. Randomization logic 204 preferably only operates to override a default port to bank connection for a port which ready to write an entry when the other port is idle.

Continuing with the example, since there is no entry in even bank 406 which matches the R15 entry 408, R15 will preferably be written to the location of the first invalid entry as indicated by even bank pointer 401. In this case, R15 is preferably written to even bank table location 2, as pointed to by pointer 401.

Figure 5:
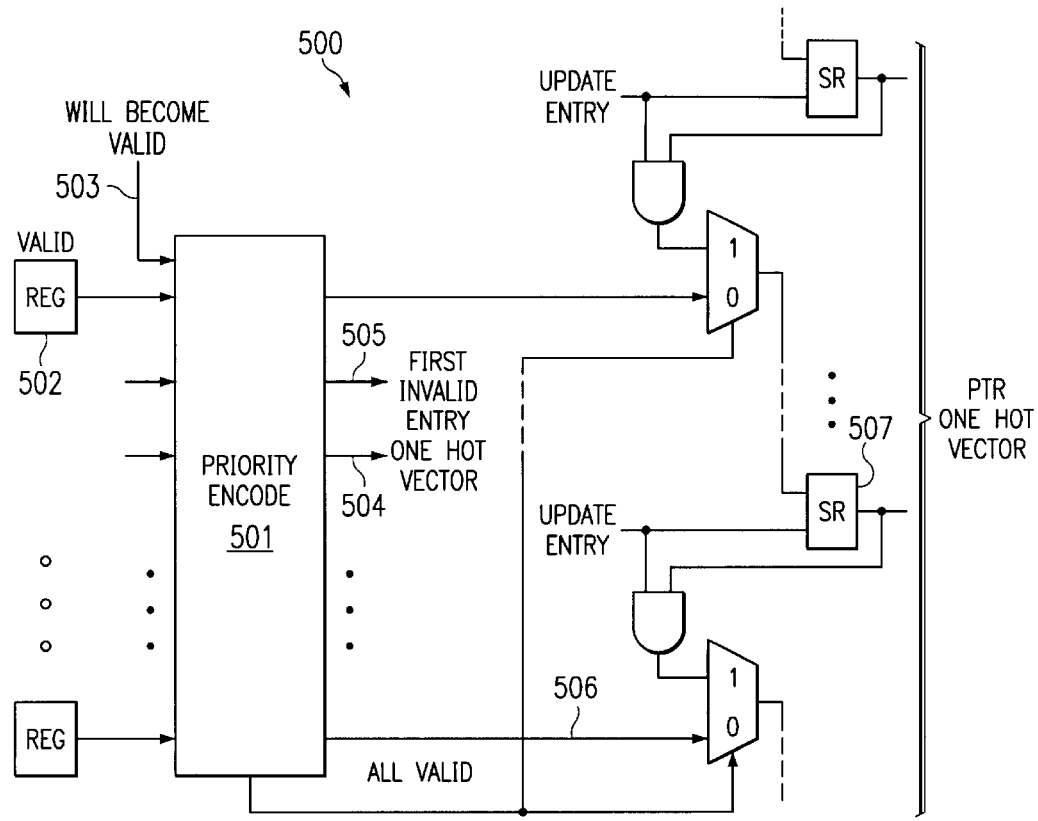
FIG. 5 depicts logic for updating pointers to reflect the validity of a table entry according to a preferred embodiment of the present invention.

FIG. 5 depicts logic for updating pointers to reflect the validity of a table entry according to a preferred embodiment of the present invention. In one embodiment of the present invention an instruction may be represented by entries in different fields of a single associative table or by different entries in separate but related associative tables. Where separate associative tables are employed, a mechanism for relating entries corresponding to a common original instruction is preferably employed. One preferred mechanism for relating table entries corresponding to a single instruction is to place entries pertaining to a common instruction in the same table location number in each of the associative tables. It will be appreciated that alternative mechanisms for relating separately tabulated entries pertaining to a single instruction may be implemented, and all such variations are included within the scope of the present invention. Generally, the term "validity," as employed in the discussion of FIG. 5, refers to a status of comparisons between a given advanced load instruction memory address and store instruction memory addresses compared against this advanced load instruction memory address. Generally, where no store instruction memory address has matched, or conflicted with, an advanced load instruction memory address, that advanced load instruction is considered valid, and the validity bit in a valid table is established so as to reflect the validity of that instruction as well as the register i.d. associated with such instruction, wherein the register i.d. may be stored in a fully associative table.

In a preferred embodiment, valid bits 502 and an indication 503 that an entry will become valid in a subsequent cycle are directed toward a priority encoder 501. Preferably, priority encoder 501 will produce a vector 504 which identifies the location of the first invalid entry 505. Preferably, priority encoder 501 may transmit a signal indicating that all entries within a bank or table are valid 506. In a preferred embodiment, the "all valid" indication 506 is transmitted to a structure which preferably further transmits the all-valid indication to mechanisms specifically associated with each entry location.

In a preferred embodiment, the mechanism associated with each entry includes a MUX and a set/reset latch, such as SR latch 507. Preferably, the update of an entry causes the set/reset latch associated with that entry to be reset and also causes the input to a MUX for the next valid entry to be set. Therefore, if an entry is valid, a "set" condition will preferably appear on an SR latch for an entry immediately following the entry which was just updated. Preferably, if one or more entries are invalid, then a latch will be set for the invalid entry in closest proximity to the priority encoder 501. Preferably, the process of setting the bit for a succeeding entry to thereby establish an appropriate pointer location propagates throughout all the latches associated with the various entries. Preferably, the latch for the last entry feeds into the first entry, thereby enabling the updating process to be made continuous throughout the bank or table in which the entry locations are located.

In a preferred embodiment, deployment of a fully associative table for storing register numbers generally provides certain advantages over the use of the two way set implementation discussed in connection with FIG. 1. A first advantage of a preferred embodiment of a fully associative table or array is that an update of the table may be accomplished in a single cycle. Another advantage of a preferred embodiment of a fully associative implementation is that it may be implemented employing a relatively straightforward hardware design. Yet another advantage of a preferred embodiment of a fully associative array is that it allows two updates to occur simultaneously. Yet another advantage of a preferred embodiment of deployment of a fully associative array is that randomization logic may be employed to ensure more complete use of the table where the table includes a plurality of data banks. Yet another advantage of a preferred embodiment of a fully associative array is that a plurality of register values having bit sequences in common may be stored in the array without conflict since the register values are generally not indexed in the array according to register number.

Figure 6:
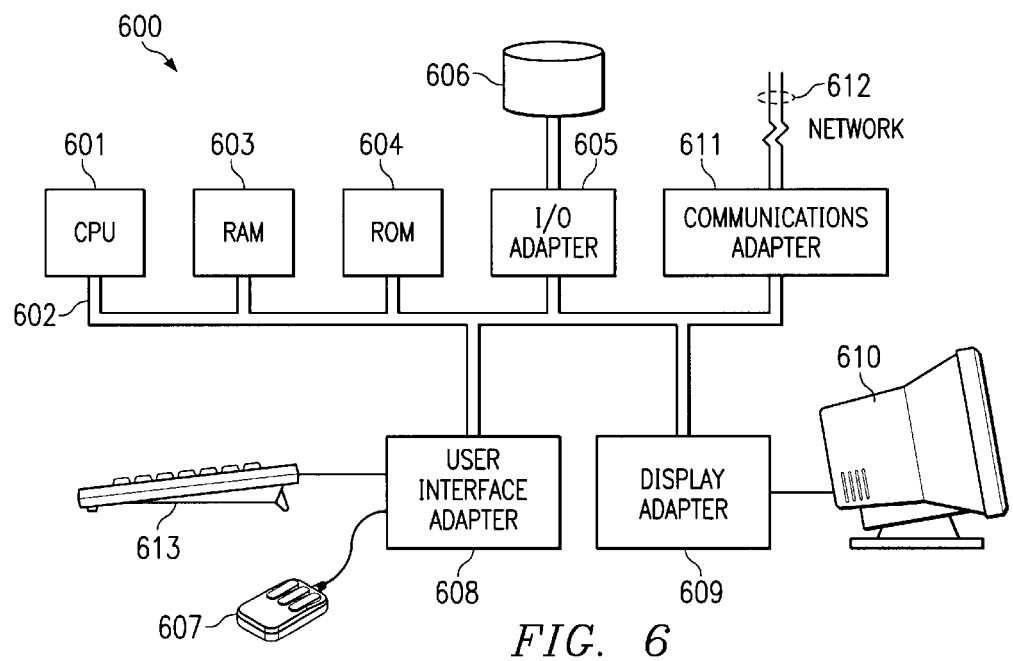
FIG. 6 depicts computer apparatus adaptable for use with a preferred embodiment of the present invention.

FIG. 6 illustrates computer system 600 adaptable for use with a preferred embodiment of the present invention. Central processing unit (CPU) 601 is coupled to system bus 602. The CPU 601 may be any general purpose CPU, such as an HP PA-8200. However, the present invention is not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

The bus 602 is also coupled to input/output (I/O) adapter 605, communications adapter card 611, user interface adapter 608, and display adapter 609. The I/O adapter 605 connects to storage devices 606, such as one or more of hard drive, CD drive, floppy disk drive, tape drive, to the computer system. Communications adapter 611 is adapted to couple the computer system 600 to a network 612, which may be one or more of local (LAN), wide-area (WAN), Ethernet or Internet network. User interface adapter 608 couples user input devices, such as keyboard 613 and pointing device 607, to the computer system 600. The display adapter 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:

a plurality of memory banks;

a plurality of ports for receiving multiple entries, in a concurrent manner, to be stored in said plurality of memory banks, wherein each entry uniquely identifies a register of a processor; and match propagation logic for directing entries from said plurality of ports to respective ones of said plurality of memory banks, wherein said match propagation logic is operable to direct entries such that each received entry is directed to a respective memory bank when a previous entry identifying a matching register was stored in said respective memory bank, each received entry not directed according to matching registers is directed to a default memory bank when an entry is received by each of said plurality of ports, and an entry is randomly directed to an available memory bank when not directed according to matching registers or default memory banks, wherein when multiple concurrent entries are not directed to a same memory bank of said plurality of memory banks due to matching registers, said multiple concurrent entries are stored in said plurality of memory banks, within a same cycle, when one entry of said multiple concurrent entries identifies a matching register and the other entry of said multiple concurrent entries does not identify a matching register.

2. The system of claim 1 wherein said match propagation logic operates to direct entries to said plurality of memory banks in a fully associative manner.

3. The system of claim 1 wherein said match propagation logic utilizes a respective pointer for each of said plurality of memory banks to identify locations within said plurality of memory banks where received entries that do not identify registers matching previous entries are to be stored.

4. The system of claim 3 further comprising:

validity logic for identify locations in said plurality of memory banks that contain valid entries.

5. The system of claim 4 further comprising:

prioritization logic for updating said respective pointers for said plurality of memory banks utilizing said validity logic.

6. A method comprising:

operating a plurality of ports to receive multiple entries, in a concurrent manner, to be stored in a plurality of memory banks, wherein each entry uniquely identifies a register of a processor;

identifying whether previous entries stored in said plurality of memory banks identify registers matching received entries;

directing entries corresponding to matching registers to said memory banks that store said respective previous entries;

directing entries not directed according to matching registers to default memory banks, when each port of said plurality of ports received an entry; and directing entries to said memory banks in a random manner, when entries are not directed according to matching registers or according to default memory banks, wherein when multiple concurrent entries are not directed to a same memory bank of said plurality of memory banks due to matching registers, said multiple concurrent entries are stored in said plurality of memory banks, within a same cycle, when one entry of said multiple concurrent entries identifies a matching register and the other entry of said multiple concurrent entries does not identify a matching register.

7. The method of claim 6 wherein said entries are stored in said memory banks in a fully associative manner.

8. The method of claim 6 further comprising:
utilizing a pointer for each of said memory banks to determine a location for storing an entry that is not directed according to a matching register for said respective memory bank.

9. The method of claim 8 further comprising:
updating logic to maintain a record of validity of entries in said memory banks.

10. The method of claim 9 further comprising:
updating pointers for said memory banks utilizing said updated logic.

11. A system comprising:
a plurality of memory means for storing entries that each uniquely identify a register of a processor;
a plurality of port means for receiving multiple entries in a concurrent manner; and
means for directing received entries from said plurality of port means to said plurality of memory means, wherein said means for directing is operable to direct entries to a respective memory means that contains a previously stored entry that identifies a matching register, is operable to direct entries that are not directed according to matching registers to default memory means when an entry is received by each of said plurality of port means, and is operable to direct entries that are not directed according to matching registers or default memory means to randomly selected memory means, wherein when multiple concurrent entries are not directed to a same memory means of said plurality of memory means due to matching registers, said multiple concurrent entries are stored in said plurality of memory means, within a same cycle, when one entry of said multiple concurrent entries identifies a matching register and the other entry of said multiple concurrent entries does not identify a matching register.

12. The system of claim 11 wherein said means for directing causes entries to be stored in said plurality of memory means in fully associative manner.

13. The system of claim 11 wherein said means for directing utilizes a respective pointer for each of said plurality of memory means to identify locations to store entries that do not identify registers matching previous entries.

14. The system of claim 13 further comprising:
means for identifying valid entries stored in said plurality of memory means.

15. The system of claim 14 further comprising:
means for updating said pointers according to said means for identifying.

* * * * *